United States Patent [19]

Garwood

[11] Patent Number: 4,801,347
[45] Date of Patent: Jan. 31, 1989

[54] METHOD OF PRODUCING A PACKAGING TRAY

[75] Inventor: Anthony J. M. Garwood, Bayswater, Australia

[73] Assignee: Garwood Limited, Victoria, Australia

[21] Appl. No.: 56,484

[22] PCT Filed: Aug. 25, 1986

[86] PCT No.: PCT/AU86/00248

§ 371 Date: Apr. 30, 1987

§ 102(e) Date: Apr. 30, 1987

[87] PCT Pub. No.: WO87/01330

PCT Pub. Date: Mar. 12, 1987

[30] Foreign Application Priority Data

Aug. 30, 1985 [AU] Australia .................... PH2222

[51] Int. Cl.$^4$ .............................................. B29D 17/00
[52] U.S. Cl. ....................................... 156/245; 156/263; 156/285; 156/286; 156/292; 264/512; 264/545
[58] Field of Search ............... 156/285, 286, 224, 221, 156/210, 581, 290, 87, 382, 245, 292, 263, 261; 264/550, 553, 229, 241, DIG. 78, 545, 547, 549, 544, 102, 551; 425/388, 405 R, DIG. 60, DIG. 102, 395

[56] References Cited

U.S. PATENT DOCUMENTS

| | | | |
|---|---|---|---|
| 2,670,501 | 3/1954 | Michiels | 264/545 |
| 3,047,451 | 7/1962 | Beck et al. | 156/219 |
| 3,242,245 | 3/1966 | Greig et al. | 156/285 X |
| 3,250,660 | 5/1966 | Greig et al. | 156/581 |
| 3,446,686 | 5/1969 | Butler et al. | 156/285 |
| 3,616,013 | 10/1971 | Bocchi | 156/285 |
| 3,814,784 | 6/1974 | Wolf | 264/550 |
| 4,192,701 | 3/1980 | Martin et al. | 156/285 |
| 4,337,116 | 6/1982 | Foster et al. | 156/285 |
| 4,457,797 | 7/1984 | Hatchadoorian et al. | 156/285 X |

FOREIGN PATENT DOCUMENTS 1410215 10/1975 United Kingdom .
2153287 8/1985 United Kingdom .

Primary Examiner—Michael W. Ball
Assistant Examiner—David Herb
Attorney, Agent, or Firm—Foley and Lardner, Schwartz, Jeffery, Schaab, Mack, Blumenthal and Evans

[57] ABSTRACT

An improved packaging method for producing trays for packaging of food. The method includes the steps of (a) providing at least two webs of plastics material (1 and 3) in parallel spaced apart relationship over an aperture (7) in a die part (5) so that the die part (5) is between the webs (1 and 3), (c) applying a female die cavity (15) to one of the webs (3) in aligned relationship to said aperture (7), (d) applying a reduction in air pressure to said female die cavity (15) whereby to draw the web closest to said female die cavity (15) thereinto, (e) applying a reduction in air pressure to said aperture (7) to draw the other web (1) into said aperture (7), (f) inserting a male die member (13) into said aperture (7) at least one of said female die cavity (5) or said male die member (13) having a surface which will form corrugations in one of the webs, (g) applying pressure between the male die member (13) and female die cavity (15) so that the two webs (1 and 3) can be bonded together and (h) then bonding the two webs (1 and 3) together where the corrugations in one web touch the other web.

10 Claims, 3 Drawing Sheets

METHOD OF PRODUCING A PACKAGING TRAY

FIELD OF THE INVENTION

This invention relates to an improved tray for packaging and relates particularly but not exclusively to an improve tray for use in the packaging of foods.

BACKGROUND OF THE INVENTION

Hitherto foods have been packaged in a relatively shallow tray and covered with a plastics material web at least on the upper surface of the tray. The plastics material from which the trays are made is usually of a single relatively rigid piece of plastics material or expanded polystyrene and it is considered that the cost of this tray is expensive.

STATEMENT OF THE INVENTION

The present invention has been devised to provide an improved method for the manufacture of such tray wherein the tray can be fabricated from this webs of plastics material and yet be less expensive and of approximately similar strength and rigidity as the former trays.

According to a first broad aspect of the present invention there may be provided an improved method of producing a packaging tray comprising:
(a) providing at least two webs of plastics material,
(b) holding both webs in spaced apart relationship over an aperture in a die part so that the die part is between the webs,
(c) applying the femal die cavity to one of the webs and in aligned relationship to said aperture,
(d) applying a reduction in air pressure to said female die cavity whereby to draw the web closest to said female die cavity thereinto,
(e) applying a reduction in air pressure to said aperture to draw the other web into said aperture,
(f) inserting a male die member into said aperture, at least one of said female die cavity or said male die member having a surface which will form corrugations in one of the webs,
(g) applying pressure between the male die member and the female die cavity so that the two webs can be bonded together,
(h) then bonding the two webs together where the corrugations in one web touch the other web.

Most preferably the internal surface of the female die cavity and the external surface of the male die member correspond in size and shape to that of the aperture—i.e. the perimeter of the tray—so that during the method, the formed tray is severed by the male die member and the female die cavity as they are inserted into said aperture. The male die member and the female die cavity can therefore be considered as a punch and die.

In accordance with a further aspect of the present invention there is provided a tray produced by the above method.

In accordance with a further aspect of the present invention there is provided an apparatus for producing a packaging tray from at least two webs of plastics material comprising a die part having an aperture therein, a male die member and a female die cavity each mounted so that said die part if therebetween and so that said male die member and said female die cavity are alignable relative to said aperture, said female die cavity having an air aperture therein for permitting the providing of a reduction of air pressure to said female die cavity, said die member having an air opening communicating with said aperture for permitting the providing of a reduction of air pressure in said aperture, at least one of said male die member and said female die cavity having a surface which will form corrugations in one of the webs when contact is made therewith, the aperture being such that when said at least two webs of plastics material are held in spaced apart relationship over said aperature with said die part therebetween, said female die cavity can be applied to one of the webs in aligned relationship to said aperature, a reduction in air pressure can be made to said female die cavity by exhausting air from said air aperture whereby to draw the web closest to said female die cavity into said female die cavity, a reduction in air pressure can be made to said air opening to draw the web of plastics material closest to said male die member into said aperture, and where said male die member can then be inserted into said aperture and pressure relatively applied to said female die cavity so that the two webs can be bonded to each other at least where the corrugations which have been formed in one web touch the other web.

BRIEF DESCRIPTION OF THE DRAWINGS

In order that the invention can be more clearly ascertained one preferred embodiment will now be described with reference to the accompanying drawings wherein.

Each of the FIGS. 1 through 6 are vertical cross-sectional views taken through the male die member, the die part and the aperture, and the female die cavity.

DETAILED DESCRIPTION OF PREFERRED EMBODIMENTS

Figure 1:
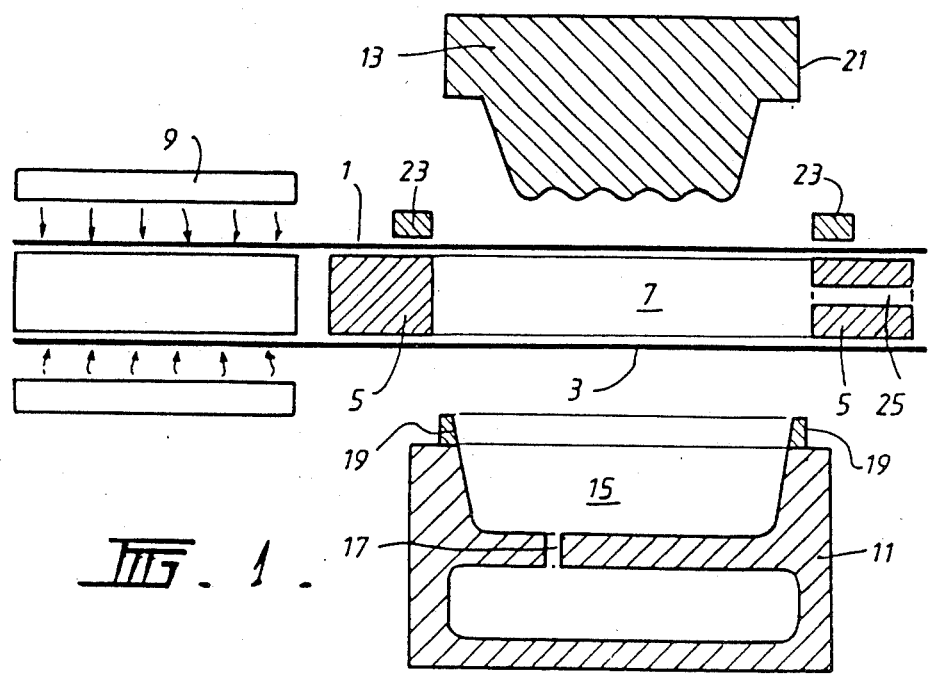
FIGS. 1 through 6 shows various method steps.

Referring firstly to FIG. 1 there is shown a first and second web of plastics material 1 and 3. The webs may be of the same material or different material however if they are of different material, they must be suitable for bonding to one another preferably by a heat bonding process. The particular embodiment herein is designed for heat bonding and other forms of bonding will be explained in due course. Suitable plastics material is typically P.E.T.C. also known as crystalizable polyester or crystalizable polyethylene tetraphthalate such as by Eastman Kodak, P.V.C., polypropylene, polystyrene, H.D.P.E. or L.D.P.E. or like plastics materials having a thickness of between 10 to 300 microns or larger. If desired the plastics material may be co-extruded plastics material which has a gas barrier therein so that desired gas can be held by such barrier between the opposed webs 1 and 3 and/or within any package to which the tray is subsequently used. The webs of plastics material 1 and 3 are held in parallel spaced apart relation between a die part 5 which has an aperture 7 therein. Typically the die part 5 comprises a plate of tool steel. The aperture 7 is arranged to have the peripheral shape of the tray.

The plastics material is heated by heating means 9 so as to provide the plastics material at a thermo-forming temperature and a heat bonding temperature. Accordingly, as the webs of plastics material 1 and 3 pass relative to the heater means 9, they are brought to the required temperature and they then pass to the region of the aperture 7. A female die cavity 11, preferably of steel, is provided on the underside of the aperture 7 underneath web 3. A male die member or punch 13 is provided above the aperture 7 and above the web of plastics material 1.

It is noted that the female die cavity 11 has a cavity 15 which may be shaped to the desired surface configuration of the undersurface of the tray—i.e. the surface of the cavity 15 may be plain surfaced or it may be corrugated or combinations thereof. The female die cavity 11 is hollow and it has an air passageway 17 which communicates with the cavity 15. The upper most surface of the female die cavity 11 has an upstanding peripheral rib 19 attached thereto, the external dimensions of which correspond almost exactly to the internal dimensions of the aperture 7. The rib 19 provides a punch and is preferably formed from tool steel.

The male die member 13 has its external peripheral surfaces 21 of approximately the same size of that of the aperture 7. Accordingly, if the female die cavity 11 is inserted into the aperture 7, then the web 3 will be severed and similarly, if the male die member 13 is inserted into the aperture 7, then the upper web of plastics material 1 will also be severed. A peripheral clamp 23 of steel surrounds the aperture 7 and is used for clamping the web of plastics material 1 to the die part 5 immediately around the aperture 7 during the movement of at least the male die member 13.

Figure 2:
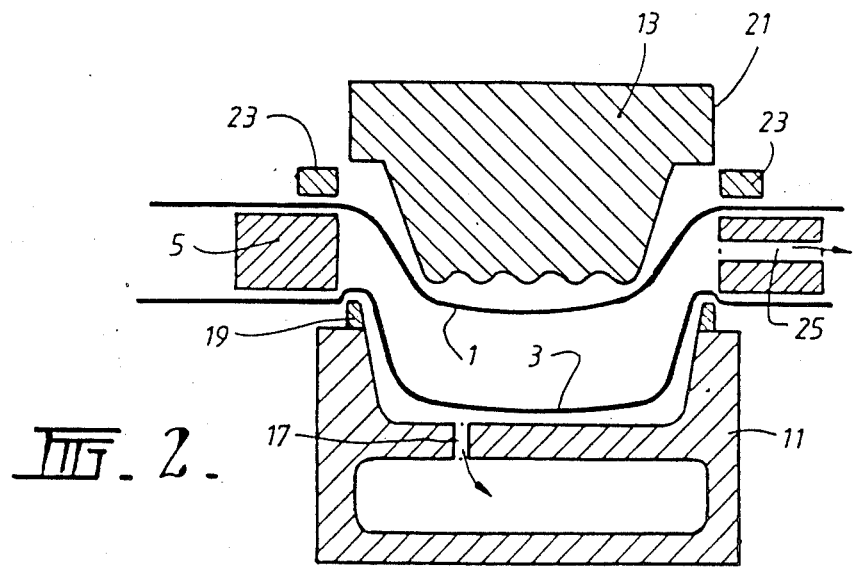

Referring now to FIG. 2 it can be seen that the female die cavity 11 has been brought up so that the peripheral rib 19 is adjacent the aperture 7 but the web of plastics material 3 is not severed at this point of time. It is also observed that air is exhausted through the air passageway 17 as the female die cavity 11 is brought up towards the die part 5. Accordingly, the web of plastics material 3 is urged downwardly into the cavity 15 immediately prior to severing the web of plastics material 3. FIG. 2 also shows that air is exhausted through an opening 25 in the die part 5 thereby drawing the web of plastics material 1 downwardly into the aperture 7. FIG. 2 also shows that the male die member 13 has started to descend into the aperture 7.

If desired the outer surface of the male die member 13 can be corrugated or smooth or combinations thereof.

Figure 3:
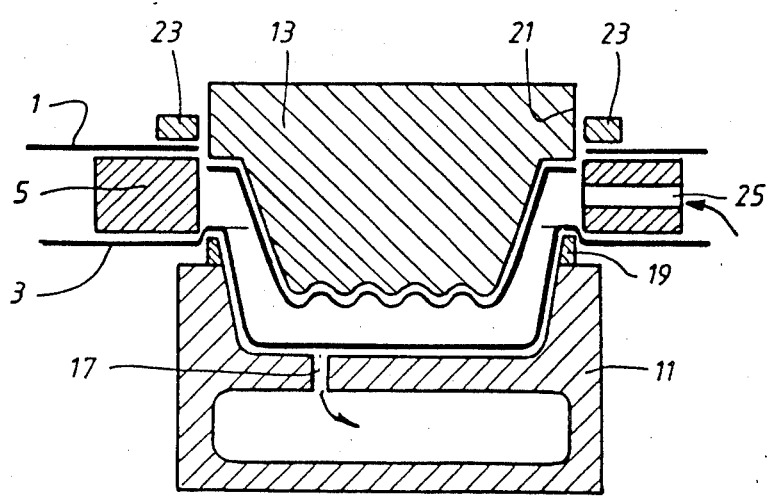

Referring now to FIG. 3 it can be seen that the male die member 13 is inserted fully into the aperture 7 and that the female die cavity 11 remains in the position shown in FIG. 2. FIG. 3 shows that the upper web of plastics material 1 is severed as the peripheral surfaces 21 of the male die member 13 are inserted into the cavity 7. During this process an air or gas such as superheated air or gas may be admitted through the exhaust opening 25 so as to (a) apply further heat to the internal surfaces of severed webs of plastics material 1 and 3 apart so that they engage the respective male die member 13 and the female die cavity 11 and conform to the surface shapes thereof. Air is continued to be exhausted through the air passageway 17 during this process.

Figure 4:
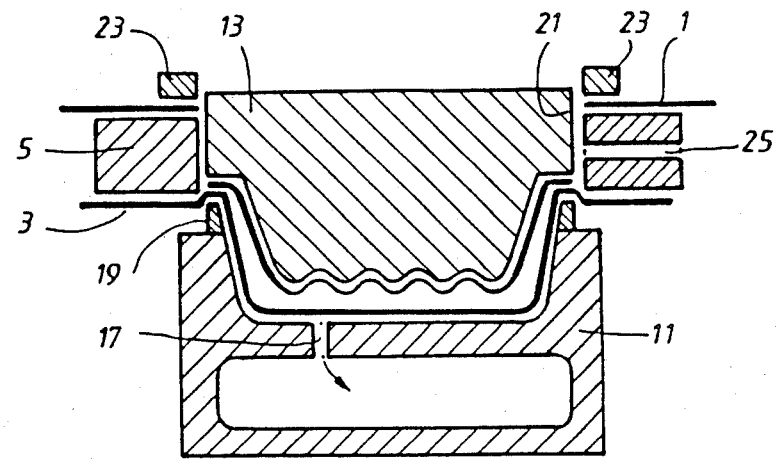

Referring now to FIG. 4, it can be seen that the male die member 13 has almost fully entered the cavity 7 and has extended into the female die cavity 11. Thus, in this condition the severed web of plastics material 1 is deformed to the surface shape of the male die member 13, and the web 3 is deformed to the surface shape of the female die cavity 11. The corrugations on the female die cavity have not been shown in the drawings to aid in clarity. Pressure is then applied between the male die member 13 and the female die cavity 11 so as to force the formed webs of plastics material 1 and 3 within the cavity 7 together. Heat bonding of the webs of plastics material 1 and 3 then occurs around the periphery of the tray and also where the respective corrugations touch the adjacent web. If desired, the contours of the female die cavity 11 and the male die member 13 can be shaped so that the corrugations will be vented to atmosphere around the perimeter during this process.

Figure 5:
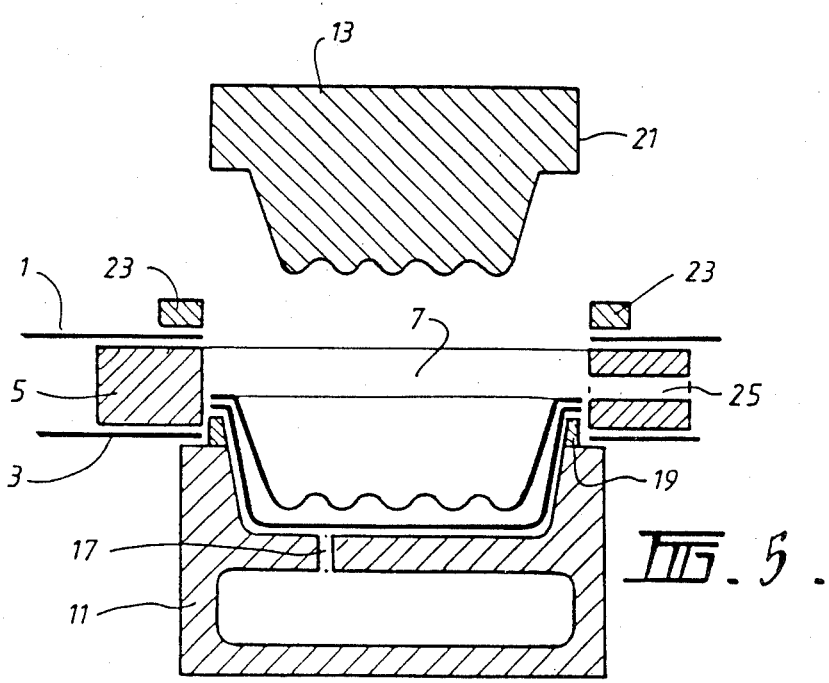

Referring now to FIG. 5 is can be seen that the male die member 13 has been retracted while the female die cavity 11 has been extended further into the aperture 7, thus completely severing the formed tray from the web of plastics material 3.

Figure 6:
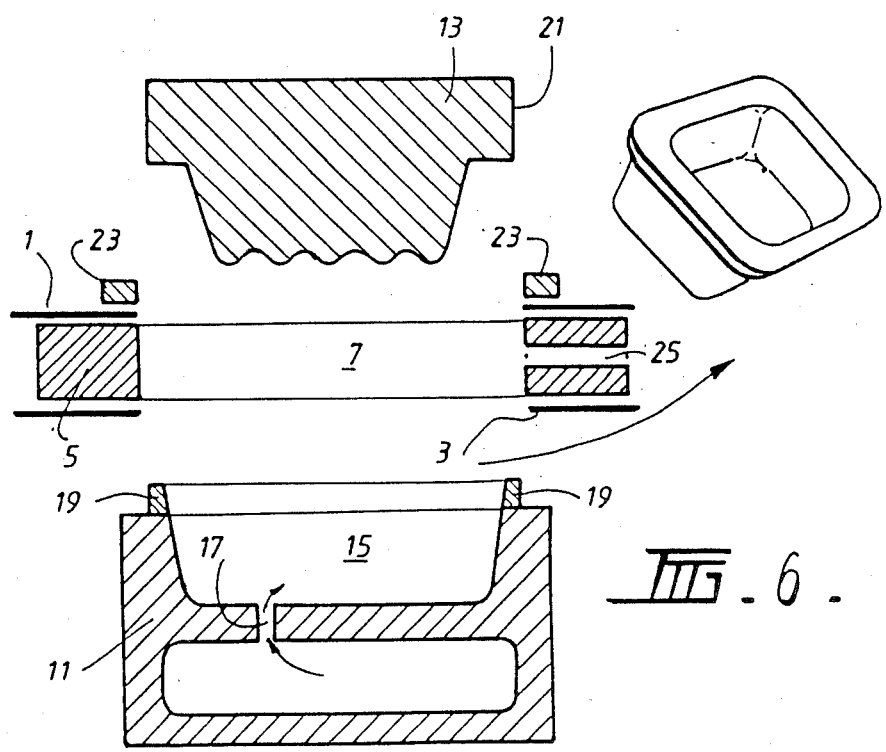

Referring now to FIG. 6 it can be seen that the female die cavity 11 has been retracted and that air is applied under pressure into the hollow female die cavity 11 so that it passes out through the opening 17 to cause ejection of the formed tray from the female die cavity 11.

The male die member 13 and the female die cavity 11 may be arranged to have high frequency welding principles applied thereto so that the bonding of the webs of plastics material 1 and 3 to each other to form the tray can be by high frequency welding. Alternatively there may be a combination of thermo-welding and dielectric welding or high frequency welding.

If desired the method where the female die cavity is inserted fully into the aperture 7 may be removed, thereby retaining the tray integral with the lower web of plastics material 3 so that it can be transported within a continuous web to a subsequent filling and package sealing station.

Further, the lower web 3 comprising the tray formed thereon can be moved to another station(s) where a further corrugated tray(s) can be inserted and welded thereto to provide a multi-layered corrugated web in a manner similar to that outlined above.

Additionally as webs 1 and 3 need to be retained at approximately 165° C. for 6 seconds to crystallize if the webs 1 and 3 are of C.P.E.T. or similar material, then the web 3 including the tray(s) can be moved to an adjacent station with similar tooling where such conditions can be provided. This can aid throughput. Preferably the female die cavity 11 is corrugated and the male die member 13 is plain surfaced. However, it is possible to have the male die member 13 corrugated and the female die cavity 11 plain surfaced or to have both the male die member 13 and the female die cavity 11 corrugated.

If desired, a desired gas, vapor or solvent or adhesive can be introduced through opening 25 during the bonding steps. These later products will assist bonding. If the corrugations of the tray are not vented to atmosphere, then a desired gas can be retained within the corrugations.

These and other modifications may be made without departing from the ambit of the invention, the nature of which is to be determined from the appended claims.

I claim:

1. A method of producing a packaging tray comprising:
   (a) providing at least two webs of plastics material,
   (b) holding both webs in spaced apart relationship over an aperture in a die part so that the die part is between the webs,
   (c) applying a female die cavity to one of the webs and in aligned relationship to said aperture,
   (d) applying a reduction in air pressure to said female die cavity whereby to draw the web closest to said female die cavity thereinto, (e) then applying a reduction in air pressure to said aperture to draw the other web into said aperture, (f) then inserting a male die member into said aperture, at least one of said female die cavity or said male die member having a surface which will form corrugations in one of the webs, (g) then applying pressure between the male die member and the female die cavity so that the two webs can be bonded together, (h) then bonding the two webs together where the corrugations in one web touch the other web.

2. A method as claimed in claim 1, including the further step of applying a positive gas pressure to siad aperture during step (f) to assist the webs of plastics material in conforming to the surface configurations of said male die member and said female die member.

3. A method as claimed in claim 2, wherein said die part is plate like and wherein it has an opening extending into said aperture, and step (f) including admitting a gas through said opening so that the said gas will be retained between the webs during step (g).

4. A method as claimed in claim 1 wherein said female die cavity has an air passageway therein and step (d) comprises exhausting air from said female die cavity through said air passageway.

5. A method as claimed in claim 1 wherein said aperture, said male die member and said female die member are correspondingly shaped to co-operate with one another, and including the step of inserting said male die member into the aperture in said die part so that material for said tray from the web of plastics material closest to said male die member will be severed.

6. The method as claimed in claim 5, including the step of inserting said female die cavity into the aperture in said die part so that material for said tray from the web of plastics material closest to said female die cavity will be severed.

7. The method as claimed in claim 1, including the step of applying a gas pressure underneath said web of plastics material closets to said female die cavity to cause the so formed tray to be ejected.

8. The method as claimed in claim 1, including the step of heating the webs of plastics material to a temperature sufficient to cause thermoforming to the surface shape of said male die member and said female die cavity and to cause bonding of said webs where the corrugations in one web touch the other web.

9. The method as claimed in claim 8, wherein said heating step is performed prior to step (f).

10. The method as claimed in claim 2, wherein the gas admitted to the aperture during step (f) is heated to a temperature adequate to soften the webs of plastics material and enhance their conformity to the respective surface configurations of said male and female die members.

* * * * *